United States Patent [19]
Unger

[11] Patent Number: 5,642,088
[45] Date of Patent: Jun. 24, 1997

[54] MAGNET SUPPORT SLEEVE FOR LINEAR ELECTROMECHANICAL TRANSDUCER

[75] Inventor: Reuven Unger, Athens, Ohio

[73] Assignee: Sunpower, Inc., Athens, Ohio

[21] Appl. No.: 540,120

[22] Filed: Oct. 6, 1995

[51] Int. Cl.⁶ ................................................ H01F 7/08
[52] U.S. Cl. ............................................. 335/222; 310/13
[58] Field of Search ................................. 335/222, 223, 335/224, 225, 226, 229, 230, 231; 310/13

[56] References Cited

U.S. PATENT DOCUMENTS

| | | | |
|---|---|---|---|
| 2,901,702 | 8/1959 | Endlich | 335/224 |
| 3,416,535 | 12/1968 | Kalthoff et al. | 335/222 |
| 4,602,174 | 7/1986 | Redlich. | |
| 4,703,297 | 10/1987 | Nagasaka | 335/229 |
| 4,808,955 | 2/1989 | Godkin et al. | 335/222 |

*Primary Examiner*—Lincoln Donovan
*Attorney, Agent, or Firm*—Frank H. Foster; Kremblas, Foster, Millard & Pollick

[57] ABSTRACT

A reciprocating magnetic body support structure for a linear motor or a linear alternator is claimed. The body comprises a cylindrical, metallic support sleeve having a plurality of longitudinal slots evenly spaced around the circumference of the sleeve. An equal number of magnet segments is mounted to the sleeve extending over at least a portion of the associated slot and attaching to the wall of the sleeve on both sides of the associated slot. The longitudinal slots preferably extend completely through the sleeve from near one longitudinal end of the sleeve to near an opposite longitudinal end of the sleeve. The sleeve is preferably stainless steel or titanium, but should, regardless of metal, have a high resistivity, i.e., above 50 micro ohms per centimeter.

23 Claims, 4 Drawing Sheets 5,642,088

1

MAGNET SUPPORT SLEEVE FOR LINEAR ELECTROMECHANICAL TRANSDUCER

TECHNICAL FIELD

This invention relates generally to the field of linear electromechanical transducers such as linear motors and alternators, and more specifically relates to a support sleeve for the reciprocating magnets of the linear electromechanical transducer.

BACKGROUND ART

It is known in the field of electromechanical transducers that a time changing magnetic field near an electrical conductor induces a voltage across the conductor and a current to flow if there is a closed loop current path. The reverse is also true: a time changing current through an electrical conductor will cause a time changing magnetic field. This is the principle under which electromechanical transducers, which includes linear alternators and motors, function.

A prior art electromechanical transducer, specifically an alternator, is shown in U.S. Pat. No. 4,602,174 to Redlich. In order to increase the magnetic flux passing through the electrical conductor (to thereby increase the current generated), a coil of wire is used and a magnet reciprocates in a central passage near the center of the coil. A further enhancement is the formation of a relatively high permeability material into a flux loop through the coil. A magnet reciprocates, not inside the coil, but in a gap formed between flux path structures, and the magnetic flux flows through the structure inducing a current in the coil.

The magnets which are to be reciprocated in the gap are often embedded in a support structure which also passes through the gap. The support structure is a rigid body which permits the structurally weak magnets to be drivingly connected to another body. Since the support structure (which is commonly electrically conductive) also encounters a time changing magnetic field, current is induced in the support structure causing energy losses. These losses reduce efficiency, and the heat generated by this undesirable current can damage the magnets.

The most common configuration for a linear electromechanical transducer is the circular, axisymmetric grouping shown in FIGS. 1A and 1B. A cylindrical magnet support structure 12 reciprocates longitudinally in a gap 14 formed between flux loop segments 10 and 16. Typically, structure 12 is made up of an electrically conductive support into which magnets are embedded. As the support structure 12 reciprocates in the gap, a time varying magnetic flux passes through the support structure 12. Eddy currents are induced in the support structure from the time changing magnetic field which the support structure 12 encounters, causing a net flow of electrical current around the circumference of the support structure 12. The circumferential flow of current causes I R losses since unwanted, unusable current is generated in the support structure 12.

There is a need for a magnet support having negligible losses due to the induced current, while providing a rigid support for the magnet segments.

BRIEF DISCLOSURE OF INVENTION

The invention is a reciprocating magnetic body for an electromechanical transducer. The magnetic body comprises a cylindrical metallic support sleeve having at least one slot. In the preferred embodiment the sleeve has a plurality of slots. The magnetic body further comprises a magnet seg-

2 ment mounted to the sleeve. In the preferred embodiment there is an equal number of magnet segments and slots. Each magnet segment preferably extends over at least a portion of an associated slot forming an equal number of paired slots and segments. It is preferred that each magnet segment of each pair attaches to the sleeve on both sides of the associated slot.

The invention contemplates slots which extend from near a first longitudinal end to near a second longitudinal end, extending completely through the sleeve, parallel to the axis of the cylindrical sleeve and evenly spaced around the periphery of the sleeve.

Figure 1A:
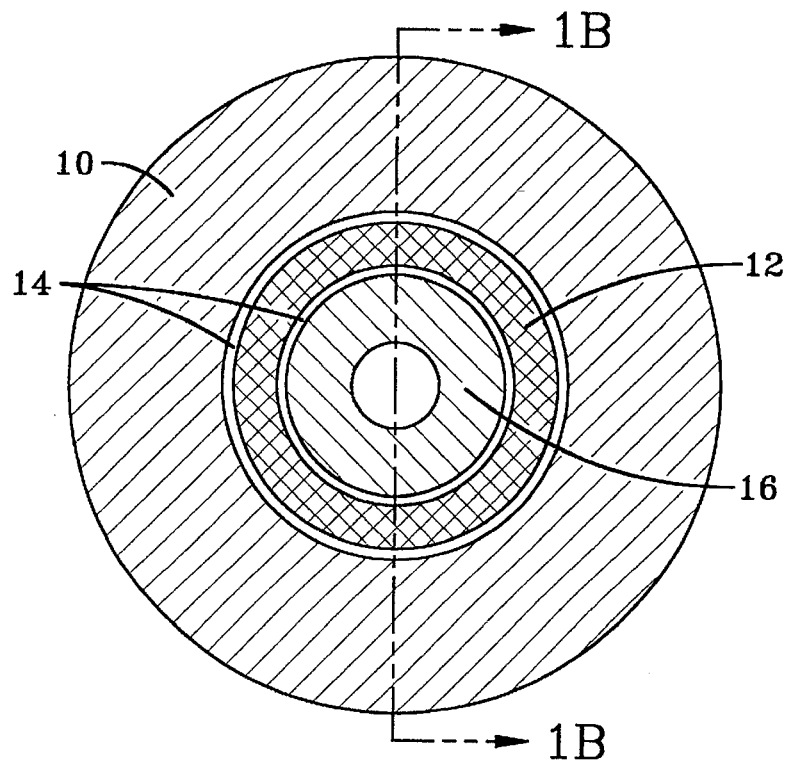
FIG. 1A is an end view in section and FIG. 1B is a side view in section illustrating a prior art linear alternator or motor.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

The present invention is directed to the reciprocating magnetic body of an electromechanical transducer, such as a linear motor or alternator. The entire transducer is not expressly described herein, since all but the reciprocating magnetic body are conventional transducer parts known to those skilled in the art. The following description of the invention is therefore primarily of the reciprocating magnetic body and its relationship to related, conventional parts which is sufficient to enable a person of ordinary skill in the art to practice the invention.

Figure 1B:
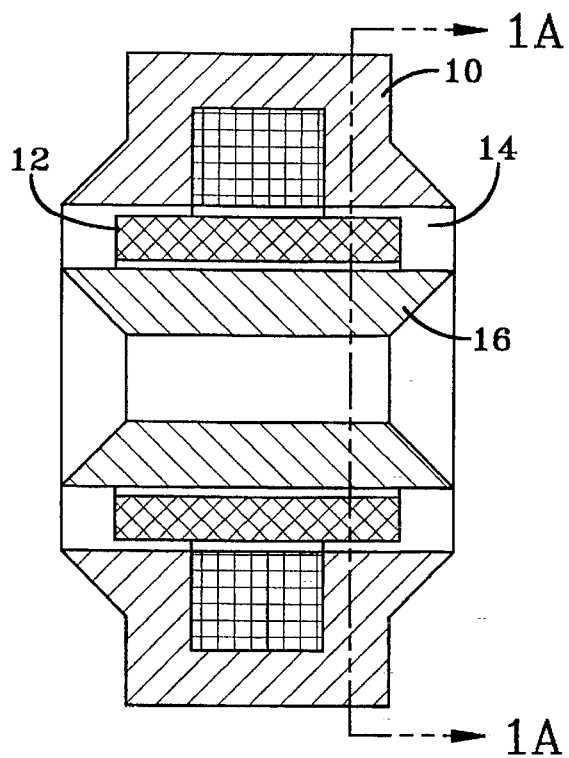
Figure 2:
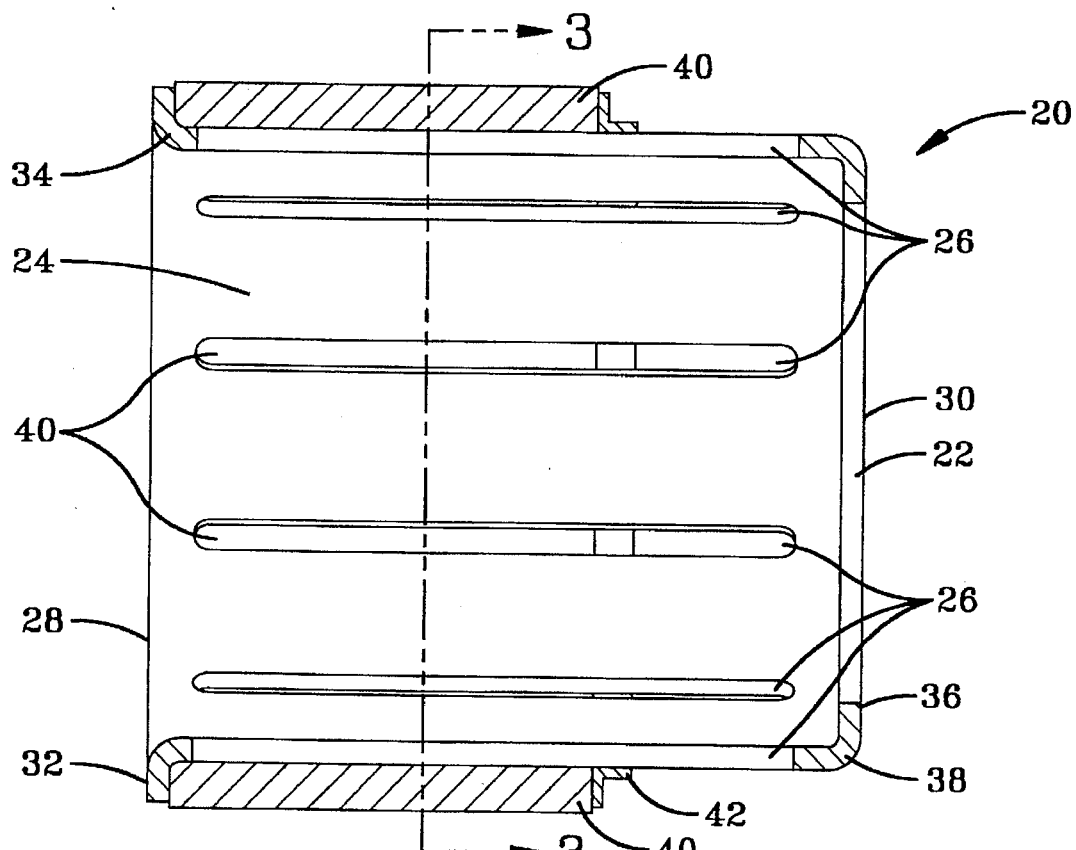
FIG. 2 is a side view in section illustrating the preferred embodiment of the present invention.

The preferred magnetic body 20 is shown in FIG. 2. A sleeve 22 has a sleeve wall 24 which is cylindrical, and in the preferred embodiment is a circular cylinder. Magnetic body 20 reciprocates in a gap between magnetic flux path segments, in close proximity thereto, as is conventional similarly to structure 12 of FIG. 1. Longitudinal slots 26 are formed in the sleeve wall 24 extending from near a first longitudinal end 28 to near a second, opposite longitudinal end 30 to limit circumferential current flow. Slots 26 are preferably not as long as the wall 24, leaving a thin circumferential ring of wall 24 remaining unslotted at opposite ends 28 and 30. Slots 26 extend preferably entirely through the thickness of the sleeve wall 24.

An outwardly extending flange 32 is formed at the first longitudinal end 28 extending at an angle of about 90° from the sleeve wall 24 around the entire circumference of sleeve wall 24, creating a joint 34 between flange 32 and sleeve wall 24. Inwardly extending flange 36 is formed at the opposite, second longitudinal end 30 forming an angle of about 90° with the wall 24 at a joint 38. Flanges 32 and 36 provide radial stiffness to the sleeve 22 and provide a mount for attaching, for example, structures which drive, or are driven by, the magnetic body 20.

Magnet segments 40 are mounted to the outer surface of sleeve 20 spaced equidistantly around the sleeve circumference. These magnet segments provide a magnetic field. This field is made to be time changing by reciprocating the magnets (as in an alternator) or the magnetic field of magnet segments 110 is affected by a time changing magnetic field generated in the coil (in a motor) to cause motion of magnetic body 20. Magnets 40 are preferably adhered to the outer surface of the sleeve wall 24 with an adhesive, placing them in very close proximity to the gap forming structures of the high permeability flux path.

Figure 8:
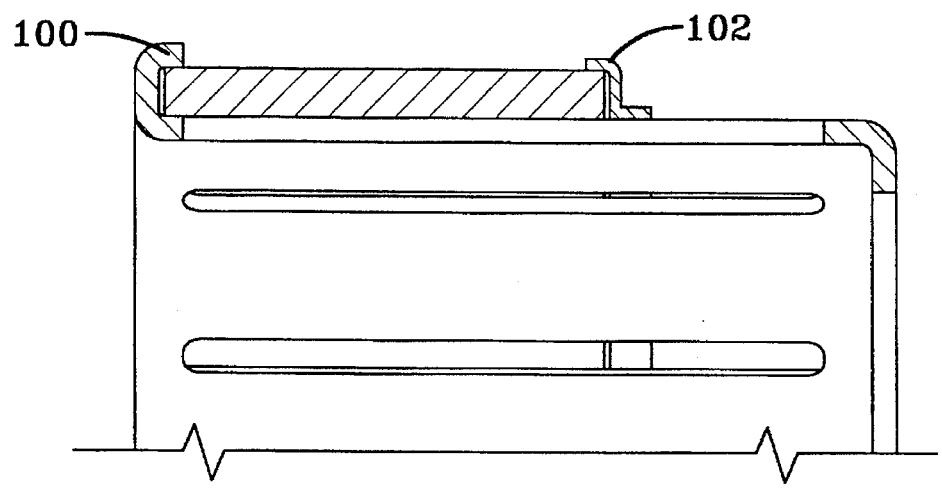
FIG. 8 is a side view in section showing a portion of an alternative cylindrical sleeve.

Magnets 40 abut at their longitudinal ends against outwardly extending flange 32 and an outwardly extending intermediate flange 42. Intermediate flange 42 is attached to the outer surface of the sleeve wall 24 intermediate the outwardly extending flange 32 and the inwardly extending flange 36. Outwardly extending flange 32 and intermediate flange 42 provide longitudinal support for magnets 40 in addition to providing adhesion surfaces perpendicular to the sleeve wall 24. The flanges 32 and 42 could be bent over the magnets 40 to more rigidly hold the magnets 40 in place, as shown by flanges 100 and 102 in FIG. 8.

Figure 3:
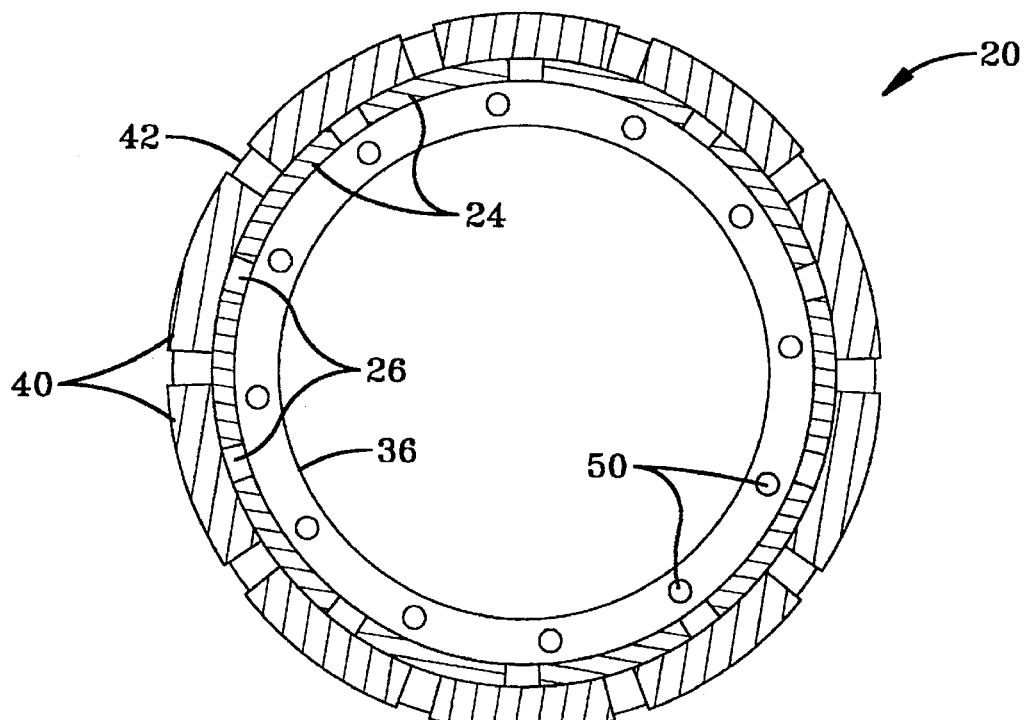
FIG. 3 is an end view in section illustrating the preferred embodiment of the present invention.

FIG. 3 shows an end view in section of the magnetic body 20 of FIG. 2, which more clearly illustrates the positioning of magnet segments 40 over slots 26. Slots 26 are evenly spaced in sleeve wall 24 and an equal number of magnet segments 40 is mounted to the sleeve wall 24. Each magnet segment 40 preferably extends over at least a portion of the length of an associated slot 26, forming a plurality of paired associated slots 26 and magnetic segments 40. There are as many magnet/slot pairs as there are slots 26. Magnet segments 40 are not required to extend over slots 26, since a portion of sleeve wall 24 remains circumferentially continuous at opposite longitudinal ends to hold the sleeve 22 together. However, it is preferred that segments 40 do extend over slots 26 and each magnet segment 40 attaches to the sleeve wall 24 on both sides of the slot 26 over which it extends, since this further rigidifies the sleeve wall 24.

Mounting holes 50 are shown in flange 36 of FIG. 3 for drivingly mounting the reciprocating magnetic body 20 to, for example, the piston of a free piston Stirling cycle engine.

Referring to FIGS. 2 and 3, the slots 26 formed in the sleeve wall 24 form an electrical barrier which is highly resistant to the circumferential flow of current around the sleeve wall 24. The resistance arises from the air gap, since air has much higher resistance than the wall 24. This current flow, as described above, is generated by the sleeve wall 24 passing through a gap in which there is a time changing magnetic field. Since the sleeve wall 24 is metal, eddy currents are generated in the sleeve wall 24 as it passes through the time changing magnetic field in the gap. These localized eddy currents would combine in devices without slots to form a net circumferential current flow around the sleeve wall 24. By forming slots 26 transverse (and preferably perpendicular) to the circumferential flow of current, a high (electrical) resistance barrier is formed which blocks, or at least reduces, the flow of current in the circumferential direction, thereby reducing losses associated with this circumferential current. Localized losses, that is, losses due to current generated between the slots, still exists in any electrically conductive material, but may be further reduced by a greater number of slots.

Figure 4:
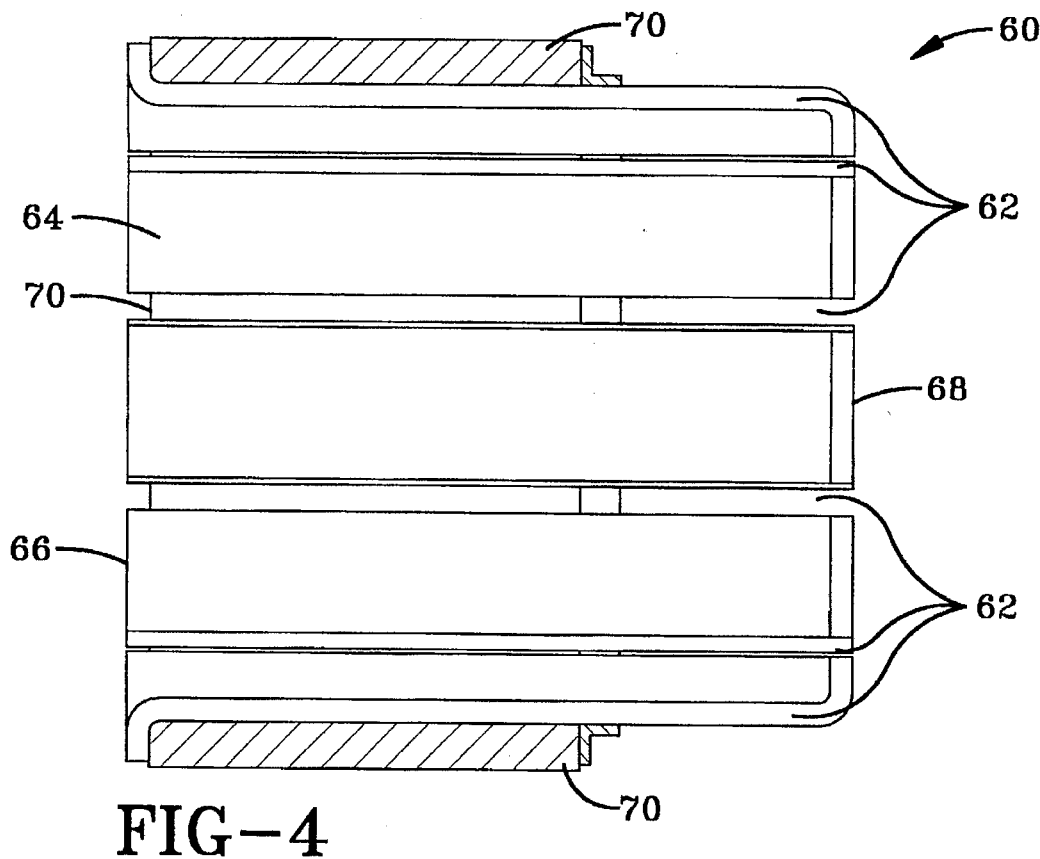
FIG. 4 is a side view in section illustrating an alternative embodiment of the present invention.

Instead of increasing the number of slots, the relative length of the slots could be varied to obtain different results. FIG. 4 shows a magnetic body 60 similar to magnetic body 20 of FIG. 2. However, instead of having length slightly less than the sleeve, slots 62 have the same length as sleeve wall 64. Slots 62 extend from one longitudinal end 66 to a second, opposite longitudinal end 68, completely through the sleeve wall 64, thereby dividing sleeve wall 64 into a plurality of individual sleeve segments held together by attached magnets 70. Magnets 70 extend from one side of slots 62 to the opposite side of slots 62, and each magnet 70 attaches to the sleeve wall 64 on both sides of each associated slot 62. In this embodiment, magnets 70 (or some other suitable structure) must extend across slots 62 to hold the segments of the sleeve wall 64 together.

The magnetic body 60 has structural disadvantages compared to magnetic body 20 (of FIGS. 2 and 3) since magnetic body 60 has no continuous, integral connecting structures at the opposite longitudinal ends, which tend to rigidify a cylinder. However, the absence of a connecting structure at the opposite longitudinal ends also reduces the flow of current circumferentially around the sleeve wall 64 compared to the embodiment of FIGS. 2 and 3.

The resistivity of the preferred magnetic body is preferably above 10 times the resistivity of copper (1.7 micro ohms per centimeter), and more preferably is above 50 micro ohms per centimeter. The resistivity of titanium is about 170 micro ohms per centimeter and the resistivity of stainless steel (300 series) is about 75 micro ohms per centimeter. If the resistivity of a material is more than 10 times that of copper (i.e. more than 17 micro ohms per centimeter), it is considered a high resistivity material; metals having this resistivity or greater are preferred for the present invention. Materials having a resistivity of less than 2 micro ohms per centimeter are considered low resistivity, and are not preferred for the present invention.

Materials having a resistivity between 2 and about 17 micro ohms per centimeter are considered medium resistivity, and may be preferred for the present invention under certain circumstances. Medium resistivity materials may be desired for their advantageous properties such as high strength or low density which may make them desirable in spite of their resistivity. However, the smaller the resistivity of a material, the greater the number of slots necessary to reduce losses. For example, copper has a resistivity of about 1.7 micro ohms per centimeter, and would require substantially more slots than titanium. Conversely, the greater the resistivity of the material, the fewer slots necessary to reduce losses and still obtain satisfactory results. This is because the greater resistivity reduces local eddy currents, and therefore local losses. By balancing the advantages of slots and resistivity, a suitable magnetic body may be obtained.

Figure 5:
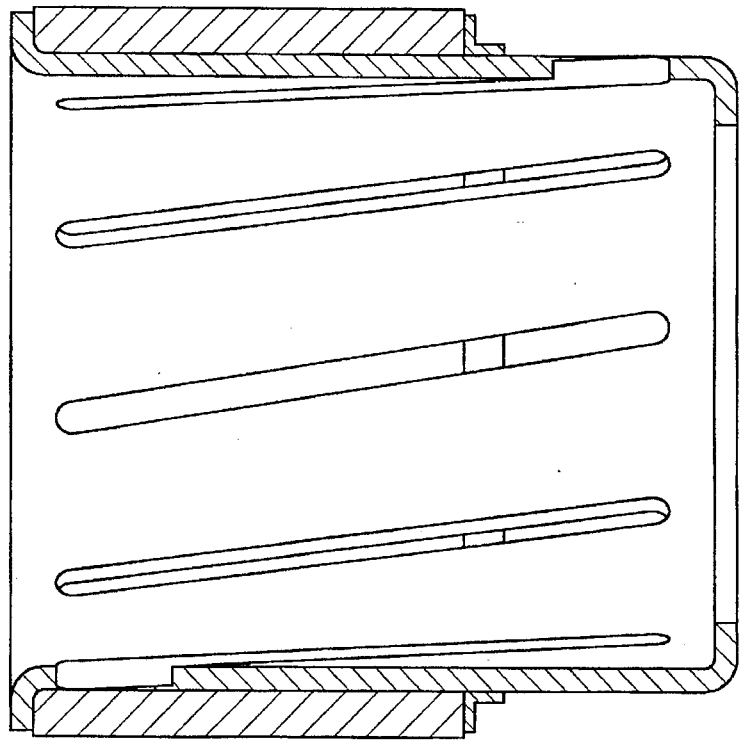
FIG. 5 is a side view in section illustrating an alternative embodiment of the present invention.

Although slots 26 of FIG. 2 and slots 62 of FIG. 4 are generally parallel to the axis of the cylindrical sleeve on which they are formed, it is possible to have slots which are not parallel to a sleeve axis. Since the flow of current around the sleeve wall is circumferential, any non-circumferential slot formed in the sleeve wall 24 will interfere with (and therefore be a barrier to) that current flow. Therefore, all slots transverse to current flow are barriers to that current, and when used in a magnetic body, are considered part of the present invention. The longitudinal slots shown in the preferred magnetic bodies are perpendicular to the flow of current, thereby providing the most effective barrier to current flow. As an alternative, slots formed in a magnetic body may have a helical orientation as shown in FIG. 5.

Figure 6:
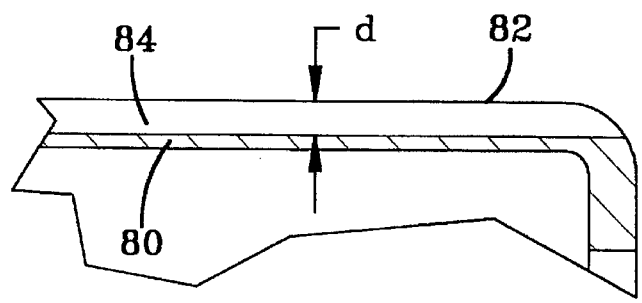
FIG. 6 is a side view in section showing a portion of a cylindrical sleeve.

In addition to the orientation of the slots formed in the sleeve, a barrier to current flow is also created by a slot which extends only partially through the sleeve wall. This type of barrier would only reduce current flow rather than eliminating it. In FIG. 6, sleeve 80 has a sleeve wall 82 in which a slot 84 is formed. Slot 84 is not formed completely through wall 82 but extends from the outer surface of wall 82 into a depth d. This current path is reduced in cross-sectional area which increases the resistance to current flow compared to an adjacent portion of the sleeve wall 82 having no slot.

Forming a slot in a sleeve of a specific material is a compromise between a decrease in structural rigidity and an increase in resistance to circumferential current flow. As with any compromise, there is a spectrum along which any combination of slot configurations, resistivities and strength characteristics is desirable for any application of the present invention. At one extreme, a slot of infinitesimal depth results in negligible structural losses, but gains inconsequential resistance to current flow. At another extreme, slots through the entire thickness, extending from one end of the sleeve to the opposite end, as shown in FIG. 4, result in dramatically reduced strength and current flow. Additionally, materials (such as copper or aluminum) having low resistivity can be used, but a substantially greater number of slots (compared to titanium) will be necessary to reduce the losses. Additionally, extremely high resistivity materials such as ceramics and plastics could be used, but the heat resistance and strength characteristics may not be suitable. Ideally, if no compromise were necessary, a sleeve of infinite strength and no thickness would be made from a material having infinite resistivity.

The inventor, in consideration of the principles of engineering compromise, has arrived at a preferred combination of slot depth and length, and sleeve material. The preferred material is one having high resistivity and substantial strength, such as titanium or stainless steel. A plurality of longitudinal slots extending completely through the thickness of the sleeve side wall from near one longitudinal end to near an opposite, longitudinal end is the preferred slot arrangement. The thickness of the sleeve wall is preferably approximately one-tenth the distance across the gap in which the entire magnetic body reciprocates (a gap is shown for the prior art in FIGS. 1A and 1B, and the gap in which the invention is reciprocated is similar). In the preferred embodiment, this is approximately 0.4 to 0.5 millimeters.

Figure 7:
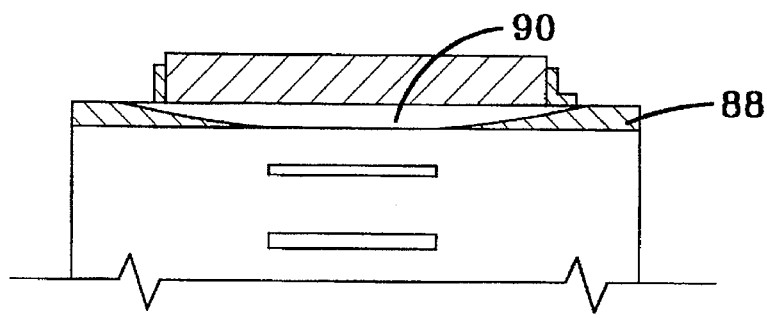
FIG. 7 is a side view in section showing a portion of an alternative cylindrical sleeve.

An alternative embodiment, which illustrates a different combination of compromises, is shown in FIG. 7. A sleeve 88 has a slot 90 having a depth which varies along the length of the sleeve 88. This provides strength at the longitudinal ends (which are exposed to a smaller amount of electromagnetic flux) by providing continuous rings of material in the areas where circumferential current flow is low. In the areas where circumferential current flow is higher (near the magnets), the slots are formed completely through the thickness of the sleeve 88.

There is an inverse proportional relationship between resistivity and the losses in the linear motor or alternator. This means as the resistivity increases, the losses decrease proportionally. Therefore, it is desirable to have a higher resistivity material if all other factors such as strength and weight are constant.

While certain preferred embodiments of the present invention have been disclosed in detail, it is to be understood that various modifications may be adopted without departing from the spirit of the invention or scope of the following claims.

I claim:

1. A reciprocating magnetic body for an electromechanical transducer, the body comprising:

(a) a cylindrical, metal support sleeve having a sleeve wall and at least one axially elongated slot formed in said sleeve wall, wherein said slot is transverse to current flow direction through the sleeve wall; and (b) a magnet segment mounted to the sleeve wall.

2. A magnetic body in accordance with claim 1, wherein the magnet segment extends over at least a portion of the slot, attaching to the sleeve on both sides of the slot.

3. A magnetic body in accordance with claim 2, wherein the sleeve is made of high resistivity metal.

4. A magnetic body in accordance with claim 3, wherein the sleeve has a plurality of slots formed in it and an equal number of magnet segments is mounted to the sleeve, each magnet segment extending over at least a portion of an associated slot forming an equal number of paired slots and segments, each magnet segment of each pair extending over at least a portion of the associated slot and attaching to the sleeve on both sides of the associated slot.

5. A magnetic body in accordance with claim 4, wherein the slots are helical.

6. A magnetic body in accordance with claim 4, wherein the slots are parallel to a sleeve axis.

7. A magnetic body in accordance with claim 6, wherein the slots are parallel to each other, and are evenly spaced around the sleeve.

8. A magnetic body in accordance with claim 4, wherein the slots are formed in the sleeve extending from a first longitudinal end of the sleeve to an opposite, second end of the sleeve.

9. A magnetic body in accordance with claim 4, wherein the slots are formed in the sleeve from near a first longitudinal end of the sleeve to near a second, opposite end of the sleeve.

10. A magnetic body in accordance with claim 4, wherein the slots extend into the sleeve to a depth which varies along a slot length.

11. A magnetic body in accordance with claim 4, wherein the slots extend into the sleeve to a depth which is constant along an entire slot length.

12. A magnetic body in accordance with claim 11, wherein the slots are formed completely through the sleeve.

13. A magnetic body in accordance with claim 4, wherein a first flange extends radially outwardly from a first end of the sleeve, and a second flange extends radially inwardly from a second end of the sleeve.

14. A magnetic body in accordance with claim 13, wherein the slots are formed through at least one of the flanges.

15. A magnetic body in accordance with claim 13, wherein the slots are formed through the sleeve, extending from near a first joint between the sleeve and the first flange to near a second joint between the sleeve and the second flange.

16. A magnetic body in accordance with claim 13, further comprising a third flange extending radially outwardly from the sleeve, intermediate the sleeve ends, and wherein the slots are formed through the sleeve, extending from near a first joint between the sleeve and the first flange to near a third joint between the sleeve and the third flange.

17. A magnetic body in accordance with claim 4, wherein the sleeve thickness is about $\frac{1}{10}$ the thickness of a gap in which the magnetic body reciprocates.

18. A magnetic body in accordance with claim 4, wherein the sleeve is a high resistivity material.

19. A magnetic body in accordance with claim 18, wherein the sleeve is titanium.

20. A magnetic body in accordance with claim 18, wherein the sleeve is stainless steel.

21. A magnetic body in accordance with claim 18, wherein the sleeve resistivity is greater than about 50 micro ohms per centimeter.

22. A magnetic body in accordance with claim 18, wherein the sleeve resistivity is greater than 10 times the resistivity of copper.

23. A magnetic body in accordance with claim 3, wherein the sleeve has a plurality of slots formed in it and an unequal number of magnet segments is mounted to the sleeve, at least one magnet segment extending over more than one slot.

* * * * *